March 10, 1936. C. TAPPAN 2,033,494
APPARATUS FOR MAINTAINING A PLURALITY
OF ELECTRICAL DEVICES IN ISOCHRONISM
Filed July 19, 1934 2 Sheets-Sheet 1

Inventor
CHESTER TAPPAN
By David Pelton Moore
Attorney

March 10, 1936.    C. TAPPAN    2,033,494
APPARATUS FOR MAINTAINING A PLURALITY
OF ELECTRICAL DEVICES IN ISOCHRONISM
Filed July 19, 1934    2 Sheets-Sheet 2

Inventor
CHESTER TAPPAN
By David Petton Moore
Attorney

Patented Mar. 10, 1936

2,033,494

UNITED STATES PATENT OFFICE 2,033,494

APPARATUS FOR MAINTAINING A PLURALITY OF ELECTRICAL DEVICES IN ISOCHRONISM

Chester Tappan, New York, N. Y.

Refiled for abandoned application Serial No. 572,205, October 30, 1931. This application July 19, 1934, Serial No. 736,630

2 Claims. (Cl. 172—293)

The present invention relates to improvements in an apparatus for maintaining a plurality of electrical devices in isochronism.

One object of the present invention being the provision of an apparatus whereby a plurality of electrical devices, such as rotary converters, will be maintained at uniform speed and in synchronism, there being provided means that are thrown into a circuit with said rotary converters to compensate for mechanical loads and variations in the original source of current.

Another object of the present invention is the provision of an apparatus as above set forth, in which this compensating action is automatically accomplished.

A still further object of this invention is the provision of an apparatus through the medium of which two or more electrical devices, such as rotary converters, through the instrumentality of a novel arrangement of mechanisms are placed in circuit with said devices or rotary converters to produce periodic electrical loads that compensate for the mechanical loads of the various rotary converters and for the variations in the current from the original source, thus insuring absolute, or as near as humanly possible, exact isochronism of the rotary converters.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

With the present apparatus, under the most adverse conditions, it would be impossible for any one of the converters or loads to be more than one-quarter of a revolution out of step, either accelerated or decelerated, thus bringing the discrepancy down to such an exceedingly fine edge that in converters operating at say 1800 R. P. M. the one-quarter of a revolution in variance would be not appreciable.

In one of the preferred installations of the present invention a plurality of ordinary rotary converters, direct current to alternating current, is used, that is where the direct current is utilized for driving purposes and taking care of the mechanical load of the converters. The present compensating device or speed and synchronizing control uses alternating current by passing the alternating current through a constantly self-driven tuning fork or vibrator which, in turn, is operated by the direct current. With that arrangement the alternating current is then passed through one pair of contacts to each rotary converter and then through its respective electrical load which may take any form so long as it is a resistance, as for instance a lamp or an inductance.

Figure 1:
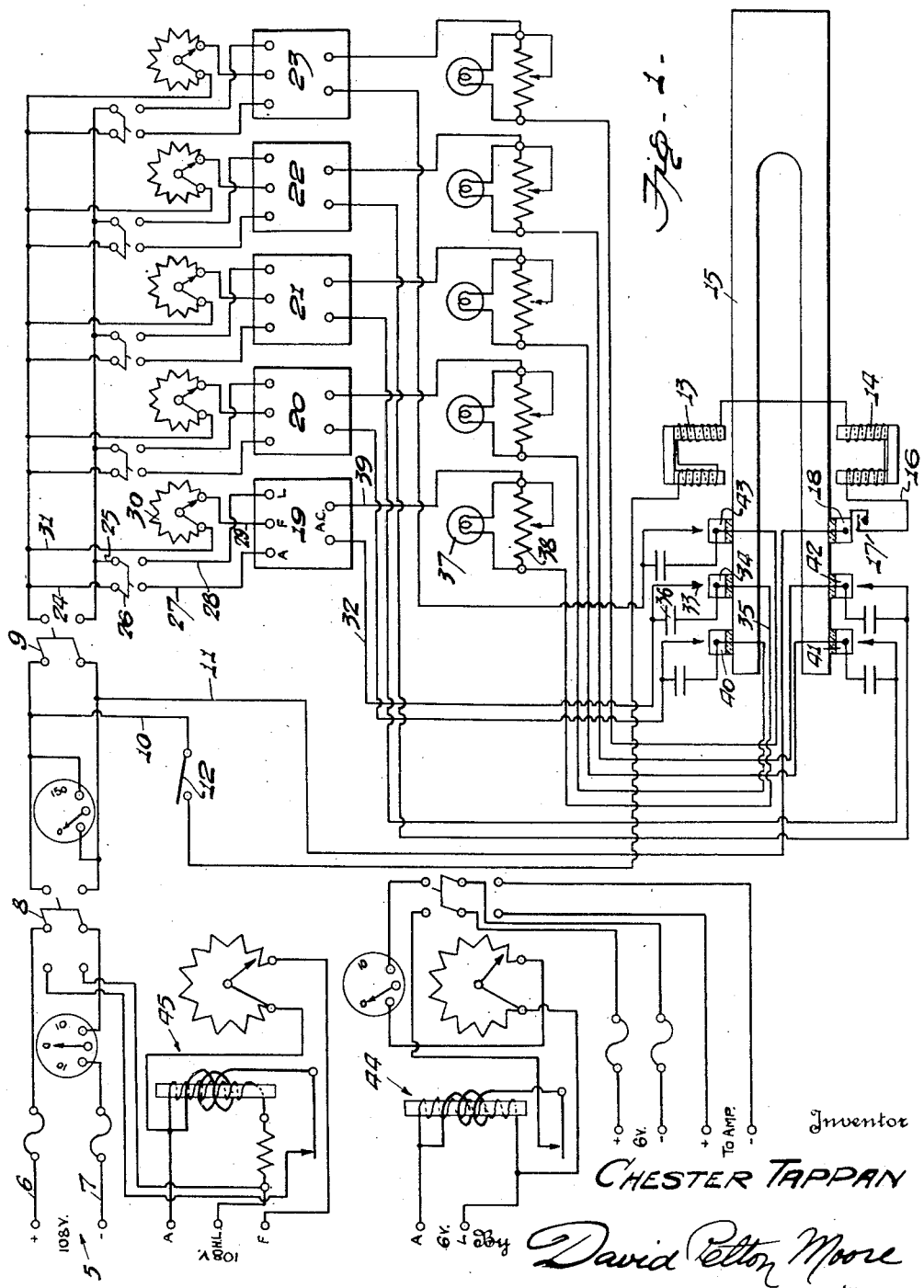
Figure 1 is a diagrammatic view of one electrical circuit embodying the present invention and is particularly arranged for use in connection with sound-on-film recording.
Figure 2:
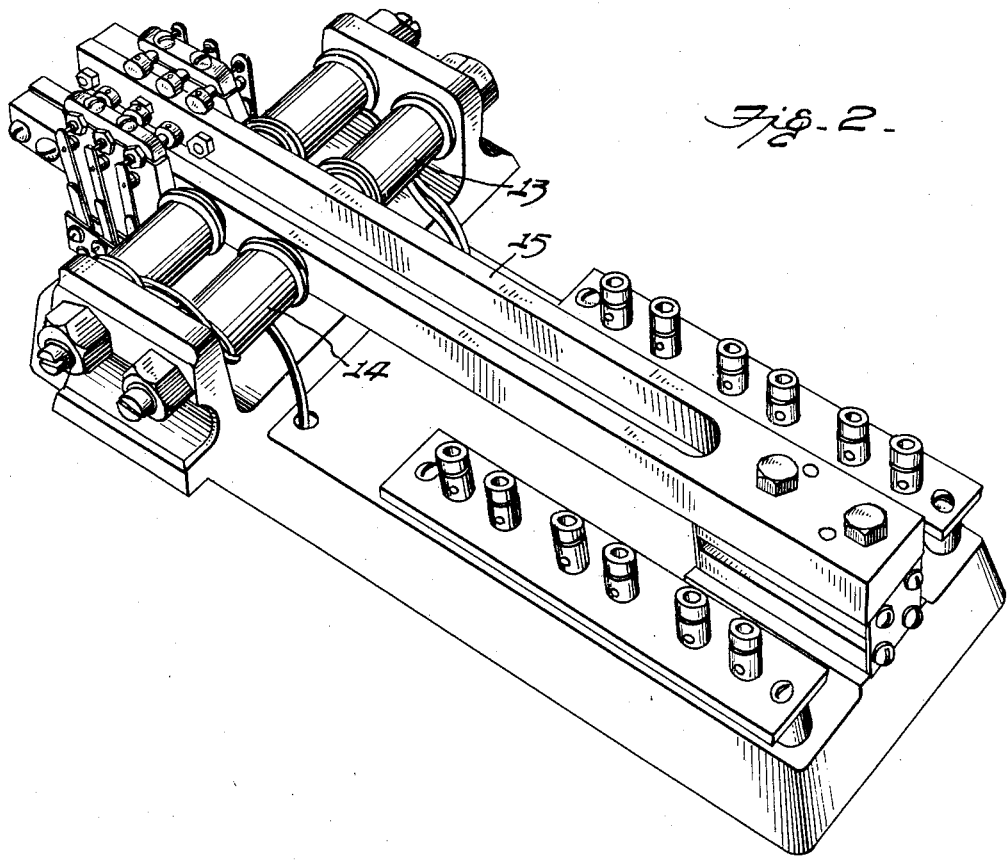
Figure 2 is a top plan view of the master control fork.

Referring to the drawings, the numeral 5 designates the direct current source having lead therefrom, the conductors 6 and 7 having the control switches 8 and 9 interposed therein. Connected to the conductors 6 and 7 are conductors 10 and 11 provided with a switch 12 and in circuit with these conductors are the two electro-magnets 13 and 14 disposed upon opposite sides of and for operating the master fork 15. A conductor 16 leads to an adjustable contact 17 disposed to be engaged by the contact 18 carried by and insulated from the fork 15 and in turn connected to the conductor 11. By this arrangement the electro-magnets 13 and 14 are energized and through the contacts 17 and 18 have the necessary interruption produced in the circuit to impart to the fork the desired vibratory action.

The rotary operating devices embodied in this particular system are here shown as five (5) rotary converters 19, 20, 21, 22 and 23, and as the circuit arrangement for one converter will suffice for all, the converter 19 will be the only one described in detail.

One side of rotary converter 19 is connected through the conductors 24 and 25 and the switch 26, conductors 27 and 28 to the conductors 6 and 7 respectively. A third conductor 29 is connected through a variable resistance 30 and a conductor 31 to the conductor 6. Also connected to the rotary converter 19 is a conductor 32 provided with a contact 33 disposed adjacent to a fork carried contact 34, there being a spark preventing condenser 36 connected across the contacts. From the contact 34 a conductor 35 is led to an adjustable electrical load 38 and a visual indicator or lamp 37 and from this point through a conductor 39, back to the other side of the converter 19. Thus the contacts 33 and 34 control the alternating current side of the rotary converters and the visual indicator or lamp indicates by its glow whether or not its respective converter is operating at its normal or an abnormal speed. The fork 15 here shown is provided with four additional pairs of contacts 40, 41, 42 and 43 which in turn control respectively the rotary converters 20, 21, 22 and 23.

There is also shown in conjunction with this panel the separate changing circuits 44 and 45 which in a sound-on-film recording apparatus are employed for charging storage batteries (not shown). These circuits are adapted to receive their operating current from independent sources and are merely shown here as completing a sound-on-film power control panel and thereby illustrating one method of practical illustration of the present invention.

The respective rotary converters, although not here shown as properly connected to their operated mechanisms, are here designed for use in conjunction with sound-on-film recording and photographing apparatus. Therefore, this particular installation being such that respective film advancing mechanisms in the motion picture cameras and sound-on-film recording cameras are operated thereby and as in practice, it is desired to operate a plurality of cameras simultaneously, or one as may be the case in conjunction with the recording camera. This particular installation is designed therefore to take care of the present type of installation for use in the production of studio, location or news-reel work.

Figure 3:
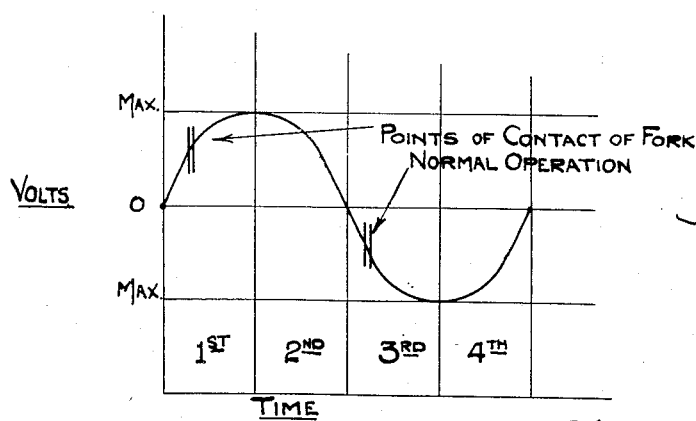
Figure 3 is a sine curve graph illustrating the points of contact within the working cycle of the rotary converters under normal operation.

In the sine curve graph, illustrated in Figure 3, it is evident that with any one of the present installations that if the times of contact are within the first and third quarter, and the mechanical load is increased by a certain percentage on the converter, producing a tendency to slow down the speed of the converter, the moments of contact will approach the zero line and the alternating current voltage will decrease proportionately, hence the electrical load will also approach zero, thereby allowing the machine to speed up again and act as an automatic compensator for the retarding action for the converter. Conversely, as the machine speeds up the voltage will immediately rise in the alternating current circuit and will tend to slow the machine down, inasmuch as the machine is more heavily loaded. Thus with a normal speed of say 1800 R. P. M. using a two-pole machine, rotary converters, the alternating current generated as for instance will be thirty (30) cycles. When used with a sixty (60) cycle fork with two engagements of the fork at every revolution of the converter, the sine curve graph of voltage versus time, the fork will inherently strike on the first quarter and the third quarter of the cycle because of the fact that the fork retains its frequency accurately for all practical purposes. Hence, if the converter accelerates or decelerates, the sine wave will advance or retard with respect to the time of contacting at the fork.

From this it can be seen that if the converter slows down and the fork contacts on the second and fourth quarter, the electrical load will increase, due to the rise in the alternating current voltage, and hence aggravate the condition until the moments of contact have reached the first and third quarters, at which time automatic regulation will commence.

On the other hand, should the converter speed up, the fork striking in the second and fourth quarters, inasmuch as the alternating current voltage is rising, the condition will be aggravated until the moments of contact fall in the first and third quarters respectively, when automatic regulation will commence. It is to be understood that a point of balance is reached for any mechanical load first by a suitable electrical load and second by means of regulating the field current of the converter at the time or period when the fork contacts are closed.

From the foregoing description, it is evident with this particular arrangement that isochronism, that is a uniform speed and synchronism, is maintained among the rotary converters, or any other electrical devices that may be substituted in lieu thereof, and that the operator by observing the lamps 38 of the apparatus may properly adjust the individual variable resistances 30 to obtain the desired adjustment for operation of the various rotary converters. Thus, the lamps 38 provide a visual check upon the actuation of the converters, and where so desired other visual means, such as meters, may be employed.

With the use of the lamps, when the converters are in step, each lamp will glow dimly and when any one of the converters starts to slip or get out of step, its respective lamp will immediately flash, glowing brighter at a higher speed and dimmer at a lower speed under normal operation.

This application is a substitute for my abandoned application Serial No. 572,205, filed October 30, 1931.

What is claimed is:

1. A system for maintaining a plurality of electrical devices in isochronism including in combination a direct current source, a vibratory member, electrical means influenced by said source to operate the vibratory member, a plurality of rotary converters the motors of which are operated from the direct current source, a plurality of interrupting means actuated by the vibratory member and in circuit with the alternating current sides of their respective converters, a variable electrical load associated with each converter and an indicating means in conjunction with each such variable electrical load, the electrical load and the indicating means being in parallel with each other and in series with the interrupting means and also in circuit with the alternating current side of their respective converter.

2. A system as claimed in claim 1 wherein the indicating means is a lamp.

CHESTER TAPPAN.